United States Patent [19]

Bushway et al.

[11] Patent Number: 4,833,191

[45] Date of Patent: May 23, 1989

[54] PROCESS FOR PREPARING PREDISPERSED FIBER COMPOSITIONS

[75] Inventors: Kenneth C. Bushway, Trenton; Thomas N. Loser, Princeton, both of N.J.

[73] Assignee: Wyrough & Loser, Trenton, N.J.

[21] Appl. No.: 104,982

[22] Filed: Oct. 6, 1987

Related U.S. Application Data

[63] Continuation of Ser. No. 770,885, Aug. 30, 1985, abandoned.

[51] Int. Cl.$^4$ .................... C08K 5/02; C08K 5/01
[52] U.S. Cl. .................... 524/473; 524/34; 524/198; 524/209; 524/315; 524/483; 524/491; 524/506; 524/507; 524/513; 524/519; 524/524; 524/525; 524/526; 524/514; 525/178; 525/184
[58] Field of Search ............... 525/178, 184; 524/483, 524/516, 473, 498, 209, 315, 491, 506, 507, 513, 525, 526, 519; 523/524

[56] References Cited

U.S. PATENT DOCUMENTS 4,125,493 11/1978 Posiviata et al. .................. 106/204

Primary Examiner—Herbert J. Lilling
Attorney, Agent, or Firm—Gene Harsh; Joseph C. Gil; Aron Preis

[57] ABSTRACT

A process for preparing a predispersed fiber composition useful for dispersing discontinuous fibers into a rubber or plastic polymer compound is disclosed which comprises mixing at least about 15 percent by weight of a pourable binder composition with up to about 85 percent by weight of discontinuous fibers at a temperature of from about 40° C. to about 150° C. until a homogeneous predispersed fiber composition is obtained. The binder composition comprises from about 50 to 100 percent by weight of a rubber or plastic polymer, from 0 to about 50 perecnt by weight of a plasticizer or peptizer for the polymer, and from 0 to about 45 percent by weight of critical chemical additives, and is pourable at ambient temperature or becomes pourable upon being heated to a temperature of up to about 135° C. and has a Brookfield viscosity of less than about 1,300,000 centipoises at the temperature at which it is pourable.

7 Claims, No Drawings

PROCESS FOR PREPARING PREDISPERSED FIBER COMPOSITIONS

This is a continuation of application Ser. No. 770,885, filed Aug. 30, 1985, now abandoned.

BACKGROUND OF THE INVENTION

This invention relates to a process for preparing predispersed fiber compositions and to the compositions prepared thereby. The invention further relates to a process for preparing fiber reinforced rubber or plastic compounds using these predispersed fiber compositions.

2. Description of the Prior Art

The use of discontinuous fibers to reinforce and fill elastomeric and polymeric compounds is well known and is widely practiced in the rubber and plastics industries. Incorporation of discontinuous fiber in rubber or plastic compounds enhances or supplements many of the properties imparted to the final product by the nature of the base compound.

For example, high modulus at low elongation can be obtained by dispersing a sufficient quantity of fiber into a rubber compound. This practice is utilized in the power transmission belt industry in the base stock or undercord of V-belts. The use of fiber in a compound also improves tear resistance, decreases creep or distortion underload, increases the resistance to cuts and punctures, and reduces cut growth. It also improves the green strength of uncured stock to improve handling.

Because of the enhancement of these properties, the use of discontinuous fibers has been adopted for various types of articles associated with the rubber and plastics industries. Discontinuous fibers are used in the fabrication of pH and pond liners, roofing materials, tarpaulins and coated fabrics, power transmission belts and conveyor belts, solid cast tires and components of pneumatic tires, including, but not limited to, tread compounds, undertread or breaker, bead, chipper and sidewall components. The improvement of cut and puncture resistance has given impetus to the tire industry to seek ways to utilize discontinuous fibers in the rubber compounds used to construct tires.

Wider use of discontinuous fibers in various materials has been restricted in part by the difficulty in properly dispersing the individual fibers to obtain their most efficient reinforcing effect. The composition and configuration of the various fibers available also differs widely making some more difficult to be incorporated in the final compound than others. For example, fibers of Kevlar ® aramid pulp are more difficult to incorporate uniformly in a polymer base than a regenerated cellulose due mainly to the differences in configuration and surface area. However, it is highly desirable to take advantage of the unique properties of the aramid fiber by maximizing the degree of dispersibility.

It is difficult to mix discontinuous fibers into massed rubber or plastic polymers and obtain a uniform and homogeneous dispersion of the fibers throughout the polymer because the fibers tend to cling together in bundles and those which are fibrillated tend to become compressed or matted together.

A number of methods for pretreating or predispersing discontinuous fibers have been suggested in an attempt to overcome this problem. For example, in an effort to reduce fiber to fiber interaction, discontinuous fibers have been slurried with a rubber latex or an oil-extended rubber latex, the latex has been coagulated on the fibers, and the coagulated rubber and fiber mixture has been filtered and dried.

Discontinuous fibers have also been pretreated with a minor amount of a plastic polymer in the presence of a lubricant. The lubricant was absorbed by the fibers and enhanced the receptiveness of the fibers to the polymer.

In another method, discontinuous fibers were dusted with a partitioning agent, such as carbon black or clay, to separate the fibers, and then oil was dispersed with and affixed to the fibers and the particles of partitioning agent. Limp fibers, such as aramid and polyester, are coated with a non-elastomeric stiffening agent prior to dusting with the partitioning agent.

In a similar method, aramid pulp is mixed with a reinforcing filler, such as carbon black or silica, and then a soluton of an elastomer in an organic solvent is added to the mixture to produce elastomeric particles, which can then be dried to remove excess solvent.

Glass fibers have been pretreated for use in reinforcing thermoplastic molding compositions by feeding strands of glass fibers through a bath containing an emulsion or solution of a thermoplastic resin in an appropriate solvent. A minor amount of a dispersion aid, such as a high viscosity hydrocarbon lubricant, a plasticizer, or a low molecular weight resin, may be added to the bath in order to facilitate dispersion of the glass fibers during the later melt forming operation. The strands leaving the bath were then passed through an oven to drive off the water or solvent and to fuse the resin. After solidification of the resin, the strands were cut to produce pellets. None of these previous pretreatment methods, however, have been found to be totally satisfactory for preparing a good dispersion of many diverse types of discontinuous fibers in elastomeric and polymeric compounds. Those methods which employ organic solvents are generally considered undesirable because such solvents are volatile and difficult to control and, therefore, present a health hazard. New applications as well as extensions of current applications of composites made from these various types of fibers and polymers would be developed by the rubber and plastics industries if the time and cost of incorporating these discontinuous fibers into an elastomeric or plastic matrix could be reduced. Such new applications would also be developed if the quality of the dispersion of the fibers into the matrix could be improved while utilizing currently available mixing equipment.

SUMMARY OF THE INVENTION

In accordance with the present invention, a predispersed fiber composition comprising discontinuous fibers and a binder composition is prepared which is useful for rapidly and homogeneously dispersing the fibers into a rubber compound or stock.

The binder composition of the present invention comprises from about 50 to 100 percent by weight of a rubber or plastic polymer, from 0 to about 50 percent by weight of a plasticizer or peptizer for the rubber or plastic polymer, and from 0 to about 45 percent by weight of conventional critical chemical additives.

The binder composition is pourable at ambient temperature or becomes pourable upon being heated to a temperature of up to 135° C. (275° F.) and has a Brookfield viscosity of less than about 1,300,000 centipoises at the temperature at which it is pourable.

In accordance with the process of the present invention, a predispersed fiber composition is prepared by mixing from up to about 85 percent by weight of discontinuous fibers with at least about 15 percent by weight of the binder composition. At the time of mixing with the fibers, the binder composition is in a pourable state. The fibers and binder are mixed at a temperature of from about 40° C. (104° F.) to about 150° C. (302° F.).

The predispersed fiber compositions so prepared can be used for preparing fiber reinforced rubber or plastic stock or compound. When rubber or plastic stock is mixed with the predispersed fiber compositions prepared in accordance with the present invention, the fibers are rapidly and homogeneously dispersed into the rubber or plastic stock.

DESCRIPTION OF THE PREFERRED EMBODIMENTS

In order to obtain a homogeneous predispersion of the fibers, it has been found that the binder composition must have a viscosity such that the binder is pourable during mixing in order to adequately wet and coat the individual fibers.

The binder composition of the present invention comprises a mixture of components which is pourable and exhibits a viscosity when it is being mixed with the discontinuous fibers which enables it to be rapidly and uniformly combined with the fibers, wetting and coating the individual fibers, to produce a homogeneous predispersed fiber composition.

If the binder composition must be heated to render it pourable, then following dispersion of the fibers in the binder composition, the resulting mixture will be allowed to cool. At the lower temperatures at which the predispersed fiber compositions would be handled, these compositions would exhibit a much higher viscosity. These predispersed fiber compositions can be readily mixed into a rubber stock or compound using conventional mixing equipment.

In accordance with the present invention, discontinuous fibers are homogeneously dispersed in a binder composition which comprises a major amount of a rubber of plastic polymer, and optionally, minor amounts of a plasticizer or peptizer for the polymer and of conventional critical chemical additives.

Unlike the prior processes which were generally directed toward treatment of a particular type of fiber, many different types of discontinuous fibers can be predispersed in accordance with the present process. Suitable fibers include, but are not limited to, cotton, rayon, nylon, polyester, and aramid fibers. The present process is particularly suitable for use with aramid pulp which is extremely difficult to predisperse homogeneously because of its high degree of fibrilization. Aramid pulp is a highly fibrillated fiber which is formed by mechanically shattering high strength, high modulus aromatic polyamide fibers of the type described in U.S. Pat. Nos. 3,869,429 and 3,869,430 in the transverse and longitudinal directions. Aramid pulp prepared from poly(p-phenylene terephthalamide) fibers is preferred. The pulp fibers prepared in this manner have a length of 0.5-8 mm and a diameter of about 12 μm, with the diameter of the fibrils which extend from the main fiber having a diameter of about 0.1 μm. Aramid pulp of this type is available commercially from E. I. DuPont de Nemours & Co., under the name Kevlar ®. The discontinuous fibers which can be predispersed using the present process generally will have an aspect ratio of about 5 to 350, although fibers with other aspect ratios can readily be employed.

The binder compositions which are employed to predisperse the discontinuous fibers contain a major amount of a rubber or plastic polymer. Suitable polymers include natural rubber, depolymerized natural rubber, styrene butadiene copolymers (SBR), polyisoprenes, polyisobutylene, polychloroprenes, nitrile rubber, ethylene-propylene copolymers (EPR), ethylene-propylenediene terpolymers (EPDM), butyl rubbers, polybutenes, ethylene vinyl acetate, polyethylene, polyesters, silicone rubber, polybutadiene, urethanes, halogenated polyethylene, and the like. These polymers can be either in liquid or solid form at room temperature. Polymers with lower Mooney viscosities are preferred because they require less heat and/or plasticization to reach the low viscosities required during the predisperson process.

If the viscosity of the rubber of plastic polymer cannot be sufficiently reduced by heating alone, a plasticizer or peptizer for the rubber or plastic polymer can optionally be added to the binder composition. Suitable plasticizers include aromatic, naphthenic and paraffin oils, paraffins, waxes, and other chemical plasticizers, such as phthalate esters, esters of adipic, azelaic and sebacic acids, di-2-ethylhexyl-phthalate, dioctyl phthalate (DOP), tricresyl phosphate (TCP), and other organic phosphates, and glycol-dicarboxylic acid polyesters, and the like. Suitable peptizers include piperidium pentamethylene dithiocarbamate (Vanax 552, R.T. Vanderbilt), dibenzamid-o-diphenyldisulfide (Pepton 44, American Cyanamid), and disulfide oil (Northwest Petrochemical).

Optionally, the binder compositions may also comprise minor amounts of conventional critical chemical additives. In the processing of rubber and plastic compositions, certain chemicals that play an important function in the final compound must be added in relatively small amounts, generally in the range of 0.1 to 5 percent by weight of the final compound although occasionally as high as 20 percent by weight. These chemicals must be added in certain critical proportions so that the desired processing conditions and/or physical properties of the finished or manufactured product are uniformly reproducible. Small variations in the amount or distribution of these chemicals in the final compound will cause serious variations in the processing and/or physical properties of the final compound. Because of the accuracy with which these chemicals must be added to rubber or plastic compositions, they have been termed "critical chemicals". Examples of critical chemicals include vulcanizing agents, curing agents, and cross-linking agents, accelerators and retardants for such agents, antidegradants, antioxidants, antiozonants, blowing agents, blowing agent activators, pigments, colorants, cure modifiers, flame retardants, chemical and heat stabilizers, bonding agents, adhesion promoters, resins, inhibitors, catalysts which extend polymer chains, acid acceptors and activators, and the like. Carbon black, silica, clay or oil, for example, would not be considered critical chemicals in a typical batch of 500 pounds of a rubber compound since they function as diluents, reinforcing agents or filler materials, and variations of a few pounds from batch to batch would hardly be noticed. Variations of 3 or 4 ounces of accelerator or vulcanizing agent in a typical batch, however, can significantly change the physical properties of the final compound and/or its processing properties. For example, it has been found to be advantageous to add a minor amount of finely divided magnesium oxide to the binder composition as an acid acceptor when neoprene rubber is used. It has also been found to be advantageous for the end user to add a minor amount of finely divided zinc oxide to the binder composition when natural rubber is used as the polymer.

Since the purpose for predispersing the fibers is to place them in a form which can be rapidly, thoroughly and homogeneously dispersed into a rubber or plastic compound or stock in order to reinforce the compound or stock, it is generally desirable to try to predisperse the largest amount of fiber possible into the binder composition. By keeping the amount of fiber at a maximum, the amount of binder composition will be kept to a minimum, and the cost of the predispersed fiber composition for a given amount of fiber will likewise be minimized. The predispersed fiber compositions comprise up to about 85 percent by weight of the discontinuous fibers. Preferably, the predispersed fiber compositions comprise from about 40 to about 85 percent by weight of the discontinuous fibers. The maximum amount of discontinuous fiber which can be predispersed in accordance with the present invention depends to a large extent on the type of fiber and its dimensions and physical properties, such as surface area. For example, aramid pulp-type fibers with a high degree of fibrillation require a larger volume of binder composition than that required for coating a filament fiber, such as rayon or polyester. The minimum amount of fiber which can be predispersed is not critical and can be as little as desired by the compounder. Below about 40 percent by weight of fibers, however, the increase in cost due to the larger amount of predispersed fiber composition required to reinforce the rubber stock with the same amount of fibers may not be economical. Therefore, the predispersed fiber compositions comprise at least about 15 percent by weight, and preferably from about 15 to about 60 percent by weight, of the binder composition.

The composition of the binder can be varied in a number of ways in order to achieve the desired characteristics. The simplest binder composition would comprise a rubber or plastic polymer which, in the absence of any plasticizer or peptizer, would be pourable and exhibit a low viscosity at ambient temperature or would become so upon being heated, but which would be sufficiently viscous when mixed with the discontinuous fibers to be readily dispersible into the polymer matrix. Such polymers would include, for example, low molecular weight or liquid polymers or elastomers, such as a low molecular weight natural rubber, e.g. depolymerized natural rubber, and low molecular weight neoprene.

Preferably, the binder composition comprises from about 50 to 100 percent by weight of a rubber or plastic polymer and from 0 to about 50 percent by weight of a plasticizer or peptizer for the polymer. The binder composition may also comprise from 0 to about 45 percent by weight of critical chemical additives.

By varying the amounts and types of rubber or plastic polymer, plasticizer or peptizer, and other critical chemical additives used, binder compositions can be prepared which are pourable at ambient temperatures or which become pourable upon being heated to a temperature of up to about 135° C. (275° F.). A suitable binder composition will have a Brookfield viscosity of less than about 1,300,000 centipoises at the temperature at which it is pourable. Pourable binder compositions in accordance with the present invention will readily separate, wet and coat the individual fibers being predisposed without the need to pretreat the fibers with a reinforcing filler, partitioning agent or lubricant and without the use of hazardous volatile solvents.

Since the purpose for preparing the predispersed fiber compositions is to place the discontinuous fibers in a form which can then be used to disperse the fibers rapidly and homogeneously into a rubber or plastic compound or stock in order to reinforce or improve other physical properties of that compound or stock, the binder composition used should contain only those ingredients or amounts of ingredients which are desirable for, or at least have no adverse effects on, the final product to be made from the reinforced rubber compound or stock. There are a number of reasons, for example, why the binder composition should only contain a minor amount of plasticizer for the rubber polymer or elastomer, i.e. no more than about 50 percent by weight of the binder composition. Discontinuous fibers are dispersed in the rubber compound or stock in order to produce a final product having a higher modulus at low elongation. Plasticizers, however, lower the modulus and tend to counteract the effect on the fibers, and as a result, may be undesirable in the final product. If the predispersed fiber composition is to be added to rubber stock which is to be employed to manufacture a V-belt or other power transmission belt, then little or no plasticizer can be included in the binder composition, since plasticizers are not generally used in the rubber stock. If a plasticizer is to be used as a processing aid during manufacture of the final product, then adding it to the binder composition of the predispersed fiber composition will be of little use during later processing. Moreover, compounders generally prefer to use plasticizers of their own choice, rather than those selected by a manufacturer of a predispersed fiber composition. The same would be true with respect to the other conventionl rubber chemical additives which can be added to the binder composition used in the present process.

The preparation of the binder composition will depend upon a number of factors, such as the ingredients used, the desired viscosity, and the manner in which the fibers will be predispersed. If a binder composition is desired which is pourable at ambient temperature, then the binder ingredients, such as a low molecular polymer and a plasticizer are thoroughly mixed together until the composition is homogeneous. If the ingredients of the binder composition do not mix readily at ambient temperature, then it may be desirable to preheat the ingredients prior to mixing. For example, the rubber or plastic polymer and the plasticizer each can be heated separately to a temperature in the range of 50°–135° C. (120°–275° F.). The polymer can then be added to the hot plasticizer and thoroughly mixed while maintaining the temperature within that range. At this point, any critical chemicals can be added to the polymer and plasticizer mix and then thoroughly mixed until a homogeneous composition is formed. Alternatively, the ingredients of the binder composition can be mixed together and heated until a homogeneous composition is obtained. The ingredients of the binder composition can be mixed together in conventional equipment such as an internal mixer, a Banbury, a sigma blade mixer, a high speed mixer or a Lightnin mixer.

Prior to mixing the binder composition with the discontinuous fibers, it may be desirable to mechanically break up or fluff the clustered or agglomerated fibers in order to separate the individual strands. Aramid pulp and some cotton fibers are preferably pretreated in this manner. These fibers can be separted or fluffed by placing them in a high speed mixer, such as a Welex, Patterson-Kelley, with intensifier bars, Gemco or similar mixer with rotor speeds of 1700-3500 RPM for about 10-20 seconds or for whatever time is necessary to achieve the desired degree of fiber separation. Other fibers, such as rayons, nylons and polyesters do not require this pretreatment. The fibers can be pretreated in the same mixer later used to prepare the predispersed fiber compositions, provided that mixer is equipped to break up such fiber entanglements and provides sufficient shear for the binder to disperse.

Following any such pretreatment of the fiber and preparation of the binder composition, the two components can be mixed together to prepare the predispersed fiber composition. Predispersed fiber compositions prepared in accordance with the present invention preferably comprise from about 40 to about 85 percent by weight of discontinuous fibers and from about 15 to about 60 percent by weight of binder composition. All or part of the discontinuous fiber is added to an appropriate mixer. The higher the viscosity of the binder composition, the greater the power of the mixer required. Mixers such as sigma blade types, internal mixers, such as Banbury, and Patterson-Kelley with intensifier bars can be employed. Any critical chemical additives which were not previously added to the binder composition can be added to the fibers in the mixer at this time.

If the binder composition is pourable at ambient temperature, then it can be added to the mixer along with any fiber not added initially and the complete mixture can be mixed. If the binder composition must be heated to render it pourable, then the heated pourable binder composition should be added and the complete mixture should be mixed at a temperature of from about 40° C. (104° F.) to about 150° C. (302° F.). The lower the viscosity of the binder composition, the faster and easier the binder separates, wets and coats the individual fibers, the greater the homogeneity of the predispersed fiber product, and the smaller the amount of fiber breakage. The fibers and binder are mixed for a sufficient time to produce a homogeneous mixture, but not so long as to cause excessive breakage of the fibers.

The predispersed fiber product is removed from the mixer in the form of loose clumps or crumbs which are suitable for direct mixing into a rubber or plastic compound or stock or for further processing into an intermediate product by mixing with a polymer of a higher viscosity.

In accordance with the process of the present invention, the discontinuous fibers are individually separated, wetted and coated by the pourable binder compositions without the need to pretreat the fiber swith a partitioning agent, reinforcing filler or lubricant and in the absence of any hazardous volatile organic solvents. Using the predispersed fiber compositions of the present invention, discontinuous fibers can be readily and homogeneously dispersed into a rubber or plastic compound or stock.

A more complete appreciation will be realized by reference to the following specific examples which relate to specific predispersed fiber compositions and to processes for preparing such compositions. In all of the examples, parts and percentages are by weight unless otherwise indicated. The following examples are not intended to limit the invention disclosed herein except to the extent that limitations are specifically stated or to the extent to which limitations appear in the appended claims.

EXAMPLE 1

Using a high speed mixer, 40 lbs. of aramid pulp (Kevlar ®, E. I. duPont de Nemours & Co.) were prefluffed by adding 10 lbs. at a time to the mixer and then mixing twice for 10 seconds after each 10 lbs. of aramid pulp had been added. A neoprene/oil premix was prepared by heating a mixture of 100 parts of a low molecular weight neoprene (Neoprene FB, E. I. duPont de Nemours & Co.) and 58 parts of an aromatic petroleum oil (Sundex 790, Sun Oil Co.) at a temperature of 60° C. (140° F.). Half of the prefluffed aramid pulp was then added to a Banbury mixer operating at 33 rpm, followed by the addition of 2 lbs. of magnesium oxide (Magchem-40, Martin-Marietta), 1 lb. 10 oz. of antioxidant (Naugawhite, Uniroyal), 1 lb. 10 oz. of bonding agent (P-1, Uniroyal), and 35 lbs. of the hot pourable neoprene/oil premix. The remaining half of the aramid pulp was then added to the Banbury and the entire mixture was mixed for 8 minutes to a temperature of 74° C. (165° F.) to produce a predispersed fiber product having the following composition:

| Component | Weight (lbs.) | Percent |
| --- | --- | --- |
| Aramid pulp | 40.000 | 49.84 |
| Neoprene FB | 22.152 | 27.60 |
| Aromatic petroleum oil | 12.848 | 16.01 |
| Magnesium oxide | 2.000 | 2.49 |
| Antioxidant | 1.625 | 2.03 |
| Bonding agent | 1.625 | 2.03 |
| | 80.250 | 100.00 |

The resulting predispersed fiber composition was in the form of loose clumps of coated fiber.

In order to determine the ability of the predispersed fiber composition to disperse the fibers rapidly and homogeneously into a rubber compound or stock, the predispersed fiber composition is subjected to the following fiber dispersion test. A masterbatch is first prepared by mixing 600 grams of a high molecular weight neoprene (Neoprene GNA, E. I. duPont de Nemours & Co.) and 500 gm. of a styrene butadiene rubber (SBR 1778, Phillips Petroleum) on a laboratory two-roll mill (6 in. × 12 in.) until a uniform sheet is produced. The water to the laboratory mill is then turned off and a styrene butadiene rubber (Type 1503, Copolymer Rubber & Chemical Corp.) is milled until the rolls heat up to 65°-70° C. (150°-160° F.). The styrene butadiene rubber used to warm up the rolls is removed. After the rolls are checked to insure that they are clean, 225 grams of the masterbatch are placed on the clean warm rolls and banded. The rolls are opened so that a small even rolling bank about the thickness of a pencil is formed. The predispersed fiber composition to be tested is then added to the masterbatch on the roll in an amount which will yield a fiber content of 20 percent based on the total weight of the mixture of the predispersed fiber composition and of the masterbatch. By controlling the flow of water, the temperature of the mill is held to 65°-70° C. (150°-160° F.). The predispersed fiber composition is milled into the masterbatch, cutting and rolling as required for good mixing. During the first 7 minutes of mixing, the mixture is cross-blended, left to right, and then right to left upending as required. During the last 30 seconds the mixture is blended only in one direction to orient the fibers in the direction of roll. At the end of 7½ minutes, approximately 0.05 in. of the mixture is sheeted off and layed flat on a plastic sheet to cool. The cooled sheet is then examined for visible undispersed fibers and judged to be good, fair or poor. A good rating is given if only a trace of undispersed fibers is visible. A fair rating is given if scattered fibers are visible. A poor rating is given if there are agglomerates of fibers visible.

Using this dispersion test, the predispersed fiber composition prepared as described above was given a good rating.

The predispersed fiber composition was then mixed into a test recipe. A masterbatch for the test recipe contained the following components:

| Component | Parts |
|---|---|
| Neoprene GNA (DuPont) | 83.0 |
| Magnesium oxide (Elastomag 170, Morton Thiokol) | 4.0 |
| Antioxidant (Agerite Stalite, R. T. Vanderbilt) | 3.0 |
| Antioxidant (Wingstay 100, Goodyear) | 1.0 |
| Stearic acid | 1.5 |
| Carbon black (N-774, Phillips Petroleum) | 10.0 |
| Carbon black (N-550, Phillips Petroleum) | 10.0 |
| | 112.5 |

The masterbatch was mixed on a two-roll mill, followed by the addition of 50.0 parts of the predispersed fiber composition prepared above, 5.0 parts of zinc oxide (AZO 55, Asarco), and 0.2 part of ethylene thiourea (END-75, Wyrough and Loser) to the masterbatch on the mill. The resulting compound contained about 15 percent by weight of aramid pulp. A sheet of the resulting compound was press cured for 20 minutes at 153° C. (307° F.) and 800–900 psi.

The tensile properties of the cured sheet were then measured using ASTM D412-83, Method A, and were determined to be as follows:

| | Direction | | | |
|---|---|---|---|---|
| | Axial | | Transverse | |
| | Tensile | Elongation | Tensile | Elongation |
| At break | 2334 psi @ | 17% | 1276 psi @ | 98% |

EXAMPLE 2

Following the procedure of Example 1 above, 40 lbs. of aramid pulp were prefluffed. A low molecular weight natural rubber/oil premix was prepared by heating a mixture of 80 parts of depolymerized natural rubber (DPR-40, Hardman), 45.6 parts of aromatic petroleum oil (Sundex 790), and 2.6 parts of antioxidant (Naugawhite) at a temperature of 54° C. (130° F.). Half of the prefluffed aramid pulp was then added to a Banbury mixer operating at 33 rpm, followed by the addition of 1 lb. 10o z. of bonding agent (P-1), 39 lbs. of the hot pourable depolymerized natural rubber/oil premix, and the remaining half of the aramid pulp. The entire mixture was then mixed for 7 minutes to a temperature of 68° C. (155° F.) to produce a predispersed fiber product having the following composition:

| Component | Weight (lbs.) | Percent |
|---|---|---|
| Aramid pulp | 40.000 | 49.61 |
| Depolymerized natural rubber | 24.337 | 30.18 |
| Aromatic petroleum oil | 13.872 | 17.21 |
| Antioxidant | 0.791 | 0.98 |
| Bonding agent | 1.625 | 2.02 |
| | 80.625 | 100.00 |

The resulting predispersed fiber composition was in the form of loose clumps of coated fibers.

The predispersed fiber composition was subjected to the dispersion test set forth in Example 1 above and given a good rating.

The predispersed fiber composition was then mixed into the test recipe and cured in accordance with the procedures set forth in Example 1 above. The resulting compound contained about 15 percent by weight of aramid pulp. The tensile properties of the cured sheet were measured and were determined to be as follows:

| | Direction | | | |
|---|---|---|---|---|
| | Axial | | Transverse | |
| | Tensile | Elongation | Tensile | Elongation |
| At break | 1905 psi @ | 10% | 722 psi @ | 73% |

EXAMPLE 3

A predispersed fiber composition containing discontinuous rayon fibers was prepared by adding 40 lbs. of rayon fibers to a Banbury mixer, followed by the addition of 2 lbs. of magnesium oxide (Magchem-40), 1 lb. 10 oz. of antioxidant (Naugawhite) and 1 lb. 10 oz. of bonding agent (P-1) and mixing at 33 rpm for 1 minute. A neoprene/oil premix was prepared as described in Example 1 above. The hot pourable neoprene/oil premix was then added to the Banbury and the entire mixture was mixed for 8 minutes at 60° C. (140° F.) to produce a predispersed fiber product having the following composition:

| Component | Weight (lbs.) | Percent |
|---|---|---|
| Rayon fibers | 40.000 | 49.84 |
| Neoprene FB | 22.152 | 27.60 |
| Aromatic petroleum oil | 12.848 | 16.01 |
| Magnesium oxide | 2.000 | 2.49 |
| Antioxidant | 1.625 | 2.03 |
| Bonding agent | 1.625 | 2.03 |
| | 80.250 | 100.00 |

The resulting predispersed rayon fiber composition was in the form of loose agglomerates or clumps of coated fibers.

The predispersed fiber composition was subjected to the dispersion test set forth in Example 1 above and was given a good rating.

The predispersed fiber composition was then mixed into a test recipe. A masterbatch for the test recipe contained the following components:

| Component | Parts |
|---|---|
| Neoprene GNA (DuPont) | 79.0 |
| Magnesium oxide (Elastomag 170) | 4.0 |
| Antioxidant (Agerite Stalite) | 3.0 |
| Antioxidant (Wingstay 100) | 1.0 |
| Stearic acid | 1.5 |
| Carbon black (N-774) | 10.0 |

| Component | Parts |
|---|---|
| Carbon black (N-550) | 10.0 |
| | 108.5 |

The masterbatch was mixed in a laboratory Banbury mixer. Then, 76.0 parts of the predispersed fiber composition prepared above, 5.0 parts of zinc oxide (AZO 55), and 0.2 part of ethylene thiourea (END-75) were added to the Banbury and the entire mixture was mixed. The compound was then cured in accordance with the procedure set forth in Example 1 above. The resulting compound contained about 20 percent by weight of rayon fibers. The tensile properties of the cured sheet were measured and were determined to be as follows:

| | Direction | | | |
|---|---|---|---|---|
| | Axial | | Transverse | |
| | Tensile | Elongation | Tensile | Elongation |
| At break | 2067 psi @ | 26% | 987 psi @ | 100% |

EXAMPLE 4

Using a high speed mixer, 40 lbs. of cotton fibers were prefluffed by adding 20 lbs. at a time to the mixer and then mixing twice for 10 seconds after each 20 lbs. of fibers had been added. A neoprene/oil premix was then prepared as described in Example 1 above. Half of the prefluffed cotton fibers were then added to a Banbury mixer, followed by the addition of 2 lbs. of magnesium oxide (Magchem-40), 1 lb. 10 oz. of antioxidant (Naugawhite), 1 lb. 10 oz. of a bonding agent (Cyrez 963 conc., American Cyanamid), and 35 lbs. of the hot pourable neoprene/oil premix. The remaining half of the prefluffed cotton fibers was then added and the entire mixture was mixed at 33 rpm for 10 minutes at 57° C. (135° F.) to produce a predispersed fiber product having the following composition:

| Composition | Weight (lbs.) | Percent |
|---|---|---|
| Cotton fibers | 40.000 | 49.84 |
| Neoprene FB | 22.152 | 27.60 |
| Aromatic petroleum oil | 12.848 | 16.01 |
| Magnesium oxide | 2.000 | 2.49 |
| Antioxidant | 1.625 | 2.03 |
| Bonding agent | 1.625 | 2.03 |
| | 80.250 | 100.00 |

The resulting predispersed cotton fiber composition was in the form of loose clumps of coated fibers.

The predispersed fiber composition was subjected to the dispersion test set forth in Example 1 above and was given a good rating.

Following the procedures of Example 1 above, the predispersed fiber composition was then mixed into a test recipe and cured. The resulting compound contained about 15 percent by weight of cotton fibers. The tensile properties of the cured sheet were measured and were determined to be as follows:

| | Direction | | | |
|---|---|---|---|---|
| | Axial | | Transverse | |
| | Tensile | Elongation | Tensile | Elongation |
| At break | 1203 psi @ | 20% | 789 psi @ | 217% |

EXAMPLE 5

A predispersed fiber composition containing discontinuous rayon fibers was prepared by adding 40 lbs. of rayon fibers to a Banbury mixer, followed by the addition, in order, of 2 lbs. of magnesium oxide (Magchem-40), 1 lb. 10 oz. of antioxidant (Naugawhite), 1 lb. 10 oz. of bonding agent (P-1), 13 lbs. of aromatic petroleum oil (Sundex 790), and 22 lbs. of a low molecular weight neoprene (Neoprene FB). The entire mixture was mixed for 8 minutes at a temperature of 65° C. (150° F.) to produce a predispersed fiber product having the following composition:

| Component | Weight (lbs.) | Percent |
|---|---|---|
| Rayon fiber | 40.000 | 49.84 |
| Neoprene FB | 22.000 | 27.41 |
| Aromatic petroleum oil | 13.000 | 16.20 |
| Magnesium oxide | 2.000 | 2.49 |
| Antioxidant | 1.625 | 2.03 |
| Bonding agent | 1.625 | 2.03 |
| | 80.250 | 100.00 |

The resulting predispersed composition was in the form of loose clumps of coated fiber.

The predispersed fiber composition was subjected to the dispersion test set forth in Example 1 above and given a good rating.

The predispersed fiber composition was then mixed into the test recipe set forth in Example 3 above and cured as described in Example 1 above. The resulting compound contained about 20 percent by weight of rayon fibers. The tensile properties of the cured sheet were measured and were determined to be as follows:

| | Direction | | | |
|---|---|---|---|---|
| | Axial | | Transverse | |
| | Tensile | Elongation | Tensile | Elongation |
| At break | 1663 psi @ | 20% | 1031 psi @ | 36% |

These tensile properties were considered to be substantially poorer than the tensile properties observed in Example 3 above. This is believed to be due to the fact that the binder used to prepare the predispersed fiber composition in Example 3 was pourable and, as a result, the predispersed fiber composition exhibited greater homogeneity, whereas, in this example, the neoprene and oil were not preheated and mixed together as had been done in Example 3 above.

EXAMPLE 6

A predispersed fiber composition containing discontinuous rayon fibers was prepared by adding 52 lbs. of rayon fiber to a Banbury mixer. A neoprene/oil premix was prepared by heating a mixture of 14 lbs. of low molecular weight neoprene (Neoprene FB) and 2 lbs. of an aromatic petroleum oil (Sundex 790) at a temperature of 60° C. (140° F.). While the mixer continued to run, 10 lbs. 8 oz. of magnesium oxide (Elastomag 170), 8 oz. of antioxidant (Naugawhite), 1 lb. 4 oz. of bonding agent (P-1), and 16 lbs. of the hot pourable neoprene/oil premix were added to the mixer. The mixture was mixed until it reached a temperature of 99°–104° C. (210°–220° F.). The total mix time was 11 minutes. The predispersed fiber product had the following composition:

| Component | Weight (lbs.) | Percent |
|---|---|---|
| Rayon fibers | 52.00 | 64.80 |
| Neoprene FB | 14.00 | 17.45 |
| Aromatic petroleum oil | 2.00 | 2.49 |
| Magnesium oxide | 10.50 | 13.08 |
| Antioxidant | 0.50 | 0.62 |
| Bonding agent | 1.25 | 1.56 |
| | 80.25 | 100.00 |

The predispersed fiber composition was in the form of loose clumps of coated fibers.

The predispersed fiber composition was subjected to the dispersion test set forth in Example 1 above and was given a good rating.

The predispersed fiber composition was then mixed into a test recipe. A masterbatch for the test recipe has the following composition:

| Component | Parts |
|---|---|
| Neoprene GNA (DuPont) | 90.0 |
| Magnesium oxide (Elastomag 170) | 4.0 |
| Antioxidant (Agerite Stalite) | 3.0 |
| Antioxidant (Wingstay 100) | 1.0 |
| Stearic acid | 1.5 |
| Carbon black (N-774) | 10.0 |
| Carbon black (N-550) | 10.0 |
| | 119.5 |

The masterbatch was mixed in a laboratory two-roll mill mixer with 55.5 parts of the predispersed fiber composition prepared above, 5.0 parts of zinc oxide (AZO 55), and 0.2 part of ethylene thiourea (END-75). The compound was then cured in accordance with the procedure set forth in Example 1 above. The resulting compound contained about 20 percent by weight of rayon fibers. The tensile properties of the cured sheet were measured and were determined to be as follows:

| Direction | | | |
|---|---|---|---|
| Axial | | Transverse | |
| Tensile | Elongation | Tensile | Elongation |
| 2320 psi @ 10% | | 310 psi @ 10% | |
| — | — | 635 psi @ 20% | |
| At break | | | |
| 2620 psi @ 15% | | 1250 psi @ 65% | |

EXAMPLE 7

A predispersed fiber composition containing discontinuous cotton fibers was prepared by adding 52 lbs. of cotton fibers to a Banbury mixer. While the mixer continued to run, 6 lbs. of magnesium oxide (Elastomag 170), 8 oz. of antioxidant (Naugawhite), 14 oz. of bonding agent (Cyrez 963), and 21 lbs. of a hot pourable neoprene/oil premix. The premix was prepared by heating a mixture of 18 lbs. 6 oz. of a low molecular weight neoprene (Neoprene FB) and 2 lbs. 10 oz. of an aromatic petroleum oil (Sundex 790) to 60° C. (140° F.). The entire mixture was mixed until it reached a temperature of 85° C. (185° F.). The predispersed fiber product had the following composition:

| Compound | Weight (lbs.) | Percent |
|---|---|---|
| Cotton fibers | 52.000 | 64.70 |
| Neoprene FB | 18.375 | 22.86 |
| Aromatic petroleum oil | 2.625 | 3.27 |
| Magnesium oxide | 6.000 | 7.46 |
| Antioxidant | 0.500 | 0.62 |
| Bonding agent | 0.875 | 1.09 |
| | 80.375 | 100.00 |

The resulting predispersed fiber composition was in the form of loose clumps of coated fibers.

The predispersed fiber composition was subjected to the dispersion test set forth in Example 1 above and was given a good rating.

The predispersed fiber composition was then mixed into the test recipe set forth in Example 6 above and cured as described in Example 1 above. The resulting compound contained about 20 percent by weight of cotton fibers. The tensile properties of the cured sheet were measured and were determined to be as follows:

| Direction | | | |
|---|---|---|---|
| Axial | | Transverse | |
| Tensile | Elongation | Tensile | Elongation |
| 1710 psi @ 10% | | 305 psi @ 10% | |
| — | — | 585 psi @ 20% | |
| At break | | | |
| 2000 psi @ 15% | | 1120 psi @ 85% | |

EXAMPLE 8

Following the procedure of Example 1 above, 35 lbs. of aramid pulp (Kevlar ®) were prefluffed in a high speed mixer. The prefluffed aramid pulp was then added to a Banbury mixer. A neoprene/oil premix was prepared by heating a mixture of 12 lbs. of low molecular weight neoprene (Neoprene FB) and 1 lb. 12 oz. of aromatic petroleum oil (Sundex 790) at a temperature of 60° C. (140° F.). While the mixer was running, 8 lbs. 6 oz. of magnesium oxide (Elastomag 170), 12 oz. of antioxidant (Naugawhite), 1 lb. 2 oz. of bonding agent (P-1), 13 lbs. 12 oz. of hot pourable neoprene/oil premix, and 11 lbs. of high molecular weight neoprene (Neoprene GNA) were added and the entire mixture was mixed for 16 minutes until it reached a temperature of 93°–100° C. (200°–212° F.). The resulting predispersed fiber product had the following composition:

| Component | Weight (lbs.) | Percent |
|---|---|---|
| Aramid pulp | 35.000 | 50.00 |
| Neoprene FB | 12.000 | 17.14 |
| Neoprene GNA | 11.000 | 15.72 |
| Aromatic petroleum oil | 1.750 | 2.50 |
| Magnesium oxide | 8.375 | 11.96 |
| Antioxidant | 0.750 | 1.07 |
| Bonding agent | 1.125 | 1.61 |
| | 7.00 | 100.00 |

The resulting predispersed fiber composition was in the form of loose clumps of coated fibers.

The predispersed fiber composition was subjected to the dispersion test set forth in Example 1 above and was given a fair rating.

The predispersed fiber composition was mixed into a test recipe and cured as described in Example 1 above. The resulting compound contained about 15 percent by weight of aramid pulp. The tensile properties of the cured sheet were measured and were determined to be as follows:

| Direction | | | |
|---|---|---|---|
| Axial | | Transverse | |
| Tensile | Elongation | Tensile | Elongation |
| At break | | | |
| 1809 psi @ 35% | | 1248 psi @ 80% | |

EXAMPLE 9

Following the procedure of Example 1 above, 35 lbs. of aramid pulp (Kevlar ®) were prefluffed in a high speed mixer. A low molecular weight natural rubber/oil premix was prepared by heating a mixture of 12 lbs. of depolymerized natural rubber (DPR-40) and 1 lb. 12 oz. of aromatic petroleum oil (Sundex 790) at a temperature of 60° C. (140° F.). A Banbury mixer was then loaded with 20 lbs. of the prefluffed aramid pulp. While the mixer was running, 8 lbs. 6 oz. of zinc oxide (104, Zochem), 12 oz. of antioxidant (Naugawhite) and 1 lb. 2 oz. of bonding agent (P-1) were added to the mixer, followed by 10 lbs. of the prefluffed aramid pulp, 13 lbs. 12 oz. of the hot pourable depolymerized natural rubber/oil premix, 5 lbs. of prefluffed aramid pulp, and 11 lbs. of prebroken high molecular weight natural rubber (SMR-5, Malaysian Rubber Producers). The total mix time was 16 minutes until a temperature of 79° C. (175° F.) was reached. The resulting predispersed fiber product had the following composition:

| Component | Weight (lbs.) | Percent |
|---|---|---|
| Aramid pulp | 35.000 | 50.00 |
| Depolymerized natural rubber | 12.000 | 17.14 |
| High M.W. natural rubber | 11.000 | 15.72 |
| Aromatic petroleum oil | 1.750 | 2.50 |
| Zinc oxide | 8.375 | 11.96 |
| Antioxidant | 0.750 | 1.07 |
| Bonding agent | 1.125 | 1.61 |
| | 70.000 | 100.00 |

The resulting predispersed fiber composition was in the form of loose clumps of coated fibers.

The predispersed fiber composition was subjected to the dispersion test set forth in Example 1 above and was given a good rating.

The predispersed fiber composition was also mixed into a test recipe. The masterbatch for the test recipe had the following composition:

| Component | Parts |
|---|---|
| High M.W. natural rubber (SMR-5) | 90.00 |
| Carbon black (N-330) | 50.00 |
| Antioxidant (Wingstay 100) | 2.00 |
| Stearic acid | 2.50 |
| | 144.50 |

The masterbatch was mixed on a two-roll mill, followed by the addition of 0.77 part of an accelerator (Santocure, Monsanto), 2.00 parts of sulfur, 5.00 parts of zinc oxide (AZO 55), and 30.00 parts of the predispersed fiber composition prepared above. The resulting compound contained about 15 phr of aramid pulp. The compound was cured in accordance with the procedure set forth in Example 1 above. The tensile properties of the cured sheet were measured and were determined to be as follows:

| Direction | | | |
|---|---|---|---|
| Axial | | Transverse | |
| Tensile | Elongation | Tensile | Elongation |
| 795 psi @ 10% | | 210 psi @ 10% | |
| 1465 psi @ 20% | | 330 psi @ 20% | |
| At break | | | |
| 1820 psi @ 20% | | 1155 psi @ 125% | |

EXAMPLE 10

Following the procedure of Example 1 above, 35 lbs. of aramid fiber (Kevlar ®) were prefluffed in a high speed mixer. A low molecular weight natural rubber/oil premix was prepared by heating a mixture of 23 lbs. of depolymerized natural rubber (DPR-40) and 1 lb. 12 oz. of aromatic petroleum oil (Sundex 790) at a temperature of 60° C. (140° F.). All of the prefluffed aramid pulp was then added to a Banbury mixer, followed by the addition, in order, of 8 lbs. 6 oz. of zinc oxide (104, Zochem), 12 oz. of antioxidant (Naugawhite), 1 lb. 2 oz. of bonding agent (P-1), and 24 lbs. 12 oz. of the hot pourable depolymerized natural rubber/oil premix The total mix time was 16 minutes until a temperature of 71° C. (160° F.) was reached. The resulting predispersed fiber product had the following composition:

| Component | Weight (lbs.) | Percent |
|---|---|---|
| Aramid pulp | 35.000 | 50.00 |
| Depolymerized natural rubber | 23.000 | 32.86 |
| Aromatic petroleum oil | 1.750 | 2.50 |
| Zinc oxide | 8.375 | 11.96 |
| Antioxidant | 0.750 | 1.07 |
| Bonding agent | 1.125 | 1.61 |
| | 70.000 | 100.00 |

The resulting predispersed fiber composition was in the form of loose clumps of coated fibers.

The predispersed fiber composition was subject to the dispersion test set forth in Example 1 above and was given a good rating.

The predispersed fiber composition was also mixed into a test recipe as set forth in Example 9 above and cured as described in Example 1 above. The resulting compound contained about 15 phr of aramid pulp. The tensile properties of the cured sheet were measured and were determined to be as follows:

| Direction | | | |
|---|---|---|---|
| Axial | | Transverse | |
| Tensile | Elongation | Tensile | Elongation |
| 895 psi @ 10% | | 145 psi @ 10% | |
| 2080 psi @ 20% | | 240 psi @ 20% | |
| At break | | | |
| 2380 psi @ 30% | | 1640 psi @ 245% | |

EXAMPLE 11

Following the procedure of Example 1 above, 35 lbs. of aramid pulp (Kevlar ®) were prefluffed in a high speed mixer. A neoprene/oil premix was prepared by heating a mixture of 12 lbs. 4 oz. of low molecular weight neoprene (Neoprene FB) and 1 lb. 12 oz. of aromatic petroleum oil (Sundex 790) to a temperature of 60° C. (140° F.). A Banbury mixer was then loaded with 30 lbs. of the prefluffed aramid pulp, followed by the addition, in order, of 8 lbs. 6 oz. of magnesium oxide (Elastomag 170), 12 oz. of antioxidant (Naugawhite), 1 lb. 2 oz. of bonding agent (P-1), 14 lbs. of the neoprene/oil premix, 5 lbs. of the prefluffed aramid pulp, and 10 lbs. 12 oz. of low molecular weight neoprene (Neoprene FB). The total mix time was 16 minutes until a temperature of 85° C. (185° F.) was reached. The resulting predispersed fiber product had the following composition:

| Component | Weight (lbs.) | Percent |
|---|---|---|
| Aramid pulb | 35.000 | 50.00 |
| Neoprene FB | 23.000 | 32.86 |
| Aromatic petroleum oil | 1.750 | 2.50 |
| Magnesium oxide | 8.375 | 11.96 |
| Antioxidant | 0.750 | 1.07 |
| Bonding agent | 1.125 | 1.61 |
|  | 70.000 | 100.00 |

The resulting predispersed fiber composition was in the form of loose agglomerates of fiber saturated with binder.

The predispersed fiber composition was subjected to the dispersion test set forth in Example 1 above and was given a good rating.

The predispersed fiber composition was also mixed into a test recipe and cured in accordance with the procedures set forth in Example 1 above. The resulting compound contained about 15 percent by weight of aramid pulp. The tensile properties of the cured sheet were measured and were determined to be as follows:

| Direction | | | |
|---|---|---|---|
| Axial | | Transverse | |
| Tensile | Elongation | Tensile | Elongation |
| At break | | | |
| 2574 psi @ 25% | | 1252 psi @ 60% | |

EXAMPLE 12

Using a laboratory Patterson-Kelley mixer, 227 grams of aramid pulp (Kevlar ®) were prefluffed by loading the mixer with the aramid pulp and then mixing for 15 seconds. A low molecular weight natural rubber-/oil premix was prepared by heating a mixture of 100 grams of depolymerized natural rubber (DPR-40) and 500 grams of aromatic petroleum oil (Sundex 740T, Sun Oil Co.) at 60° C. (140° F.). After the aramid pulp had been prefluffed, 122 grams of the hot pourable depolymerized natural rubber/oil premix was poured into the mixer through a tube. The total mix time was 6 minutes. The resulting predispersed fiber product had the following composition:

| Component | Weight (g) | Percent |
|---|---|---|
| Aramid pulp | 227.00 | 65.04 |
| Depolymerized natural rubber | 20.33 | 5.83 |
| Aromatic petroluem oil | 101.67 | 29.13 |
|  | 349.00 | 100.00 |

The resulting predispersed fiber composition was in the form of loose clumps of coated fibers.

The predispersed fiber composition was subjected to the dispersion test set forth in Example 1 above and was given a poor rating. The predispersed fiber composition was not homogeneous because there was too little binder to adequately coat the large amount of high surface area aramid pulp.

EXAMPLE 13

Using a high speed mixer, 500 grams of aramid pulp (Kevlar ®) were prefluffed. A low molecular weight natural rubber/oil premix was prepared by heating a mixture of 144 grams of depolymerized natural rubber (DPR-40) and 75 grams of aromatic petroleum oil (Sundex 740T) at a temperature of 60° C. (140° F.). The prefluffed aramid pulp was then placed in a laboratory Banbury mixer, followed by the addition, in order, of 12 grams of zinc oxide, 3 grams of antioxidant (Naugawhite), 7.2 grams of bonding agent (P-1), and 219 grams of the hot depolymerized natural rubber/oil premix, while the mixer was running. The total mix time was 8 minutes until a temperature of 77° C. (170° F.) was reached. The resulting predispersed fiber product had the followig composition:

| Component | Weight (g) | Percent |
|---|---|---|
| Aramid pulp | 560.0 | 69.90 |
| Depolymerized natural rubber | 144.0 | 17.97 |
| Aromatic petroleum oil | 75.0 | 9.36 |
| Zinc oxide | 12.0 | 1.50 |
| Antioxidant | 3.0 | 0.37 |
| Bonding agent | 7.2 | 0.90 |
|  | 801.2 | 100.00 |

The resulting predispersed fiber composition was in the form of loose clumps of coated fibers.

The predispersed fiber composition was subjected to the dispersion test set forth in Example 1 above and was given a poor rating.

The predispersed fiber composition was also mixed into a test recipe. The masterbatch for the test recipe had the following composition:

| Component | Parts |
|---|---|
| High M.W. natural rubber (SMR-5) | 92.3 |
| Carbon black (N-330) | 50.0 |
| Antioxidant (Wingstay 100) | 2.0 |
| Stearic acid | 2.5 |
|  | 146.8 |

The masterbatch was mixed on a two-roll mill, followed by the addition of 0.77 part of accelerator (Santocure), 2.00 parts of sulfur, 5.00 parts of zinc oxide (AZO 55), and 42.80 parts of the predispersed fiber composition prepared above. The resulting compound contained about 15 phr of aramid pulp. A sheet of the resulting compound was press cured for 35 minutes at 153° C. (307° F.). The tensile projection of the cured sheet were measured and were determined to be as follows:

| Direction | | | |
|---|---|---|---|
| Axial | | Transverse | |
| Tensile | Elongation | Tensile | Elongation |
| At break | | | |

| Direction | | | |
|---|---|---|---|
| Axial | | Transverse | |
| Tensile | Elongation | Tensile | Elongation |
| 1661 psi @ 40% | | 1101 psi @ 288% | |

EXAMPLE 14

Using a high speed mixer, 640 grams of aramid pulp (Kevlar ®) were prefluffed. A low molecular weight natural rubber/oil premix was prepared by heating a mixture of 95 grams of depolymerized natural rubbrer (DPR-40) and 50 grams of aromatic petroleum oil (Sundex 740T) at a temperature of 60° C. (140° F.). The prefluffed aramid pulp was then placed in a laboratory Banbury mixer, followed by the addition, in order, of 8 grams of zinc oxide, 2 grams of antioxidant (Naugawhite), 5 grams of bonding agent (P-1), and 145 grams of the hot depolymerized natural rubber/oil premix, while the mixer was running. The total mix time was 8 minutes until a temperature of 77° C. (170° F.) was reached. The resulting predispersed fiber product had the following composition:

| Component | Weight (g) | Percent |
|---|---|---|
| Aramid pulp | 640.0 | 80.00 |
| Depolymerized natural rubber | 95.0 | 11.88 |
| Aromatic petroleum oil | 50.0 | 6.25 |
| Zinc oxide | 8.0 | 1.00 |
| Antioxidant | 2.0 | 0.25 |
| Bonding agent | 5.0 | 0.62 |
| | 800.0 | 100.00 |

The resulting predispersed fiber composition was in the form of loose clumps of coated fibers.

The predispersed fiber composition was subjected to the dispersion test set forth in Example 1 above and was given a very poor rating.

The predispersed fiber composition was also mixed into a test recipe. The masterbatch for the test recipe had the following composition:

| Component | Parts |
|---|---|
| High M.W. natural rubber (SMR-5) | 95.5 |
| Carbon black (N-330) | 50.0 |
| Antioxidant (Wingstay 100) | 2.0 |
| Stearic acid | 2.5 |
| | 150.0 |

The masterbatch was mixed on a two-roll mill, followed by the addition of 0.77 part of accelerator (Santocure), 2.0 parts of sulfur, 5.0 parts of zinc oxide (AZO 55), and 37.5 parts of the predispersed fiber composition prepared above. The resulting compound contained about 15 phr of aramid pulp. A sheet of the resulting compound was press cured for 35 minutes at 153° C. (307° F.). The tensile properties of the cured sheet were measured and were determined to be as follows:

| Direction | | | |
|---|---|---|---|
| Axial | | Transverse | |
| Tensile | Elongation | Tensile | Elongation |
| At break | | | |
| 1216 psi @ 65% | | 905 psi @ 240% | |

EXAMPLE 15

Using a high speed mixer, 480 grams of aramid pulp (Kevlar ®) were prefluffed. A low molecular weight natural rubber/oil premix was prepared by heating a mixture of 192 grams of depolymerized natural rubber (DPR-40) and 100 grams of aromatic petroleum oil (Sundex 740T) at a temperature of 60° C. (140° F.). The prefluffed aramid pulp was then placed in a laboratory Banbury mixer, followed by the addition, in order, of 16 grams of zinc oxide, 4 grams of antioxidant (Naugawhite), 9.6 grams of bonding agent (P-1), and 292 grams of the hot depolymerized natural rubber/oil premix, while the mixer was running. The total mix time was 8 minutes until a temperature of 77° C. (170° F.) was reached. The resulting predispersed fiber product had the following composition:

| Component | Weight (g) | Percent |
|---|---|---|
| Aramid pulp | 480.0 | 59.88 |
| Depolymerized natural rubber | 192.0 | 23.95 |
| Aromatic petroleum oil | 100.0 | 12.47 |
| Zinc oxide | 16.0 | 2.00 |
| Antioxdant | 4.0 | 0.50 |
| Bonding agent | 9.6 | 1.20 |
| | 801.6 | 100.00 |

The resulting predispersed fiber composition was in the form of loose clumps of coated fibers.

The predispersed fiber composition was subjected to the dispersion test set forth in Example 1 above and was given a good rating.

The predispersed fiber composition was also mixed into a test recipe. The masterbatch for the test recipe had the following composition:

| Component | Parts |
|---|---|
| High M.W. natural rubber (SMR-5) | 88.0 |
| Carbon black (N-330) | 50.0 |
| Antioxidant (Wingstay 100) | 2.0 |
| Stearic acid | 2.5 |
| | 142.5 |

The masterbatch was mixed on a two-roll mill, followed by the addition of 0.77 part of accelerator (Santocure), 2.0 parts of sulfur, 5.0 parts of zinc oxide (AZO 55), and 50.0 parts of the predispersed fiber composition prepared above. The resulting compound contained about 15 phr of aramid pulp. A sheet of the resulting compound was press cured for 35 minutes at 153° C. (307° F.). The tensile properties of the cured sheet were measured and were determined to be as follows:

| Direction | | | |
|---|---|---|---|
| Axial | | Transverse | |
| Tensile | Elongation | Tensile | Elongation |
| At break | | | |
| 1753 psi @ 35% | | 1173 psi @ 285% | |

EXAMPLE 16

A predispersed fiber composition was prepared by adding 500 grams of ¼-inch chopped aramid filament (Kevlar®29, E. I. duPont de Nemours & Co.) to a laboratory Banbury mixer, followed by the addition of 75 grams of magnesium oxide (Elastomag 170), 4 grams of antioxidant (Naugawhite), 10 grams of bonding agent (P-1) and 245 grams of a hot pourable neoprene/oil premix, while the mixer was running. The neoprene/oil premix was previously prepared by heating a mixture of 210 grams of low molecular weight neoprene (Neoprene FB) and 35 grams of aromatic petroleum oil (Sundex 740T) at a temperature of 60° C. (140° F.). The total mix time was 8 minutes until a temperature of 77° C. (170° F.) was reached. The resulting predispersed fiber product had the following composition:

| Component | Weight (g) | Percent |
|---|---|---|
| Chopped aramid filament | 500 | 59.95 |
| Neoprene FB | 210 | 25.18 |
| Aromatic petroleum oil | 35 | 4.20 |
| Magnesium oxide | 75 | 8.99 |
| Antioxidant | 4 | 0.48 |
| Bonding agent | 10 | 1.20 |
| | 834 | 100.00 |

The resulting predispersed fiber composition was in the form of loose clumps of coated fibers.

The predispersed fiber composition was subjected to the dispersion test set forth in Example 1 above and was given a good rating.

The predispersed fiber composition was also mixed into a test recipe. The masterbatch for the test recipe had the following composition:

| Component | Parts |
|---|---|
| Neoprene GNA | 89.6 |
| Magnesium oxide (Elastomag 170) | 4.0 |
| Antioxdiant (Agerite Stalite) | 3.0 |
| Antioxidant (Wingstay 100) | 1.0 |
| Stearic acid | 1.5 |
| Carbon black (N-774) | 10.0 |
| Carbon black (N-550) | 10.0 |
| | 119.1 |

The masterbatch was mixed on a two-roll mill, followed by the addition of 5.0 parts of zinc oxide (AZO 55), 0.2 parts of ethylene thiourea (END-75), and 41.4 parts of the predispersed fiber composition prepared above. The resulting compound contained about 15 percent by weight of chopped aramid filament. A sheet of the resulting compound was cured as described in Example 1 above. The tensile properties of the cured sheet were measured and were determined to be as follows:

| Direction | | | |
|---|---|---|---|
| Axial | | Transverse | |
| Tensile | Elongation | Tensile | Elongation |
| At break | | | |
| 1989 psi @ 18% | | 1000 psi @ 98% | |

EXAMPLE 17

A predispersed fiber composition was prepared by adding 52 lbs. of polyester fiber to a Banbury mixer, followed by the addition of 14 lbs. of hot pourable low molecular weight neoprene. The low molecular weight neoprene (Neoprene FB) had been preheated to a temperature of 60° C. (140° F.). The total mix time was 11 minutes until a temperature of 77° C. (170° F.) was reached. The resulting predispersed fiber product had the following composition:

| Component | Weight (lbs.) | Percent |
|---|---|---|
| Polyester fiber | 52 | 78.79 |
| Neoprene FB | 14 | 21.21 |
| | 66 | 100.00 |

The resulting predispersed fiber composition was in the form of loose clumps of coated fibers.

The predispersed fiber composition was subjected to the dispersion test set forth in Example 1 above and was given a good rating.

The predispersed fiber composition was also mixed into a test recipe. The masterbatch for the test recipe had the following composition:

| Component | Parts |
|---|---|
| Neoprene GNA | 1.0 |
| Magnesium oxide (Elastomag 170) | 4.0 |
| Antioxidant (Agerite Stalite) | 3.0 |
| Antioxidant (Wingstay 100) | 1.0 |
| Stearic acid | 1.5 |
| Carbon black (N-774) | 10.0 |
| Carbon black (N-550) | 10.0 |
| | 120.5 |

The masterbatch was mixed on a two-roll mill, followed by the addition of 5.0 parts of zinc oxide (AZO 55), 0.2 part of ethylene thiourea (END-75), and 42.8 parts of the predispersed fiber composition prepared above. The resulting compound contained about 20 percent by weight of polyester fiber. A sheet of the resulting compound was cured as described in Example 1 above. The tensile properties of the cured sheet were measured and were determined to be as follows:

| Direction | | | |
|---|---|---|---|
| Axial | | Transverse | |
| Tensile | Elongation | Tensile | Elongation |
| At break | | | |
| 2065 psi @ 40% | | 930 psi @ 85% | |

What is claimed is:

1. A predispersed aramid fiber composition useful for dispersing discontinuous aramid fibers into a rubber or plastic compound, wherein said composition comprises an effective amount up to about 85 percent by weight of discontinuous aramid fibers, homogeneously dispersed in at least about 15 percent by weight of a binder composition, wherein the binder composition consists essentially of from about 50 to 100 percent by weight of a rubber polymer, which is liquid at room temperature, an effective amount up to about 50 percent by weight of a plasticizer or peptizer for the rubber polymer, and from 0 to about 45 percent by weight of critical chemical additives, and wherein the rubber polymer, the plasticizer or peptizer for the rubber polymer, and the critical chemical additives, and the amounts of the rubber polymer, the plasticizer or peptizer for the rubber polymer, and the critical chemical additives are selected so that the binder composition is pourable at ambient temperature or becomes pourable upon being heated to a temperature of up to about 135° C. and has a Brookfield viscosity of less than about 1,300,000 centipoises at the temperature at which it is pourable and wherein the pourable binder composition does not comprise any hazardous organic solvent.

2. The predispersed fiber composition of claim 1 wherein the aramid fibers are aramid pulp.

3. The predispersed fiber composition of claim 2 wherein the aramid pulp is poly(p-phenylene terephthalamide) pulp.

4. The predispersed fiber composition of claim 1 wherein the polymer is a low molecular weight polychloroprene.

5. The predispersed fiber composition of claim 1 wherein the polymer is a low molecular weight natural rubber.

6. A method of using the composition of claim 1 comprising mixing a rubber stock or polymeric compound with said aramid fiber composition until the discontinuous fibers are homogeneously dispersed throughout said rubber stock or plastic compound.

7. A process for preparing a fiber reinforced rubber or plastic compound, said process comprising
   (a) preparing a predispersed fiber composition by mixing at least about 15 percent by weight of a pourable binder composition with an effective amount up to about 85 percent by weight of discontinuous fibers at a temperature of from about 40° C. to about 150° C. until a homogeneous predispersed fiber composition is obtained,
   wherein the binder composition comprises from about 50 to 100 percent by weight of a rubber polymer, which is liquid at room temperature, from 0 to about 50 percent by weight of a plasticizer or peptizer for the polymer, and from 0 to about 45 percent by weight of critical chemical additives, and
   wherein the polymer, the plasticizer or peptizer for the polymer, and the critical chemical additives, and the amounts of the polymer, the plasticizer or peptizer for the polymer, and the critical chemical additives are selected so that the binder composition is pourable at ambient temperature or becomes pourable upon being heated to a temperature of up to about 135° C. and has a Brookfield viscosity of less than about 1,300,000 centipoises at the temperature at which it is pourable, and
   (b) mixing said predispersed fiber composition with a rubber or plastic compound until the discontinous fibers are homogeneously dispersed throughout the compound.

* * * * *